United States Patent
Reinert et al.

(10) Patent No.: US 7,224,879 B2
(45) Date of Patent: May 29, 2007

(54) LC CONNECTOR REMOVAL TOOL

(75) Inventors: Thomas D. Reinert, Port Clinton, OH (US); Mark G. Bieberstein, West Chicago, IL (US)

(73) Assignee: Ideal Industries, Inc., Sycamore, IL (US)

( * ) Notice: Subject to any disclaimer, the term of this patent is extended or adjusted under 35 U.S.C. 154(b) by 0 days.

(21) Appl. No.: 11/062,375

(22) Filed: Feb. 22, 2005

(65) Prior Publication Data

US 2005/0276560 A1 Dec. 15, 2005

Related U.S. Application Data

(60) Provisional application No. 60/546,730, filed on Feb. 23, 2004.

(51) Int. Cl.
G02B 6/00 (2006.01)
G02B 6/10 (2006.01)

(52) U.S. Cl. ...................................... 385/134; 385/147
(58) Field of Classification Search ................ 385/134, 385/139, 147
See application file for complete search history.

(56) References Cited

U.S. PATENT DOCUMENTS

| 1,378,209 A | * | 5/1921 | Bergman | 81/165 |
| 5,956,832 A | * | 9/1999 | Reagan | 29/278 |
| 6,094,780 A | * | 8/2000 | McGlothlin et al. | 16/430 |

* cited by examiner

Primary Examiner—Kevin S. Wood
(74) Attorney, Agent, or Firm—Cook, Alex, McFarron, Manzo, Cummings & Mehler, Ltd.

(57) ABSTRACT

An LC connector removal tool has a handle connected to an elongated shank which terminates at first and second spaced fingers. The shank has a channel-shaped cross section including first and second walls connected by a side wall which define a clearance groove between them. The inner, facing surfaces of the fingers have detent grooves that extend across the width of the fingers. The tips of the fingers fit around an LC connector body while one of the fingers overlies the connector's latch or trigger. The upper finger depresses the latch or trigger as the tool slides over the LC connector. The trigger or latch then engages the detent groove. This engagement of the trigger or latch with the detent groove permits the tool to pull the connector out of its adaptor socket.

10 Claims, 5 Drawing Sheets

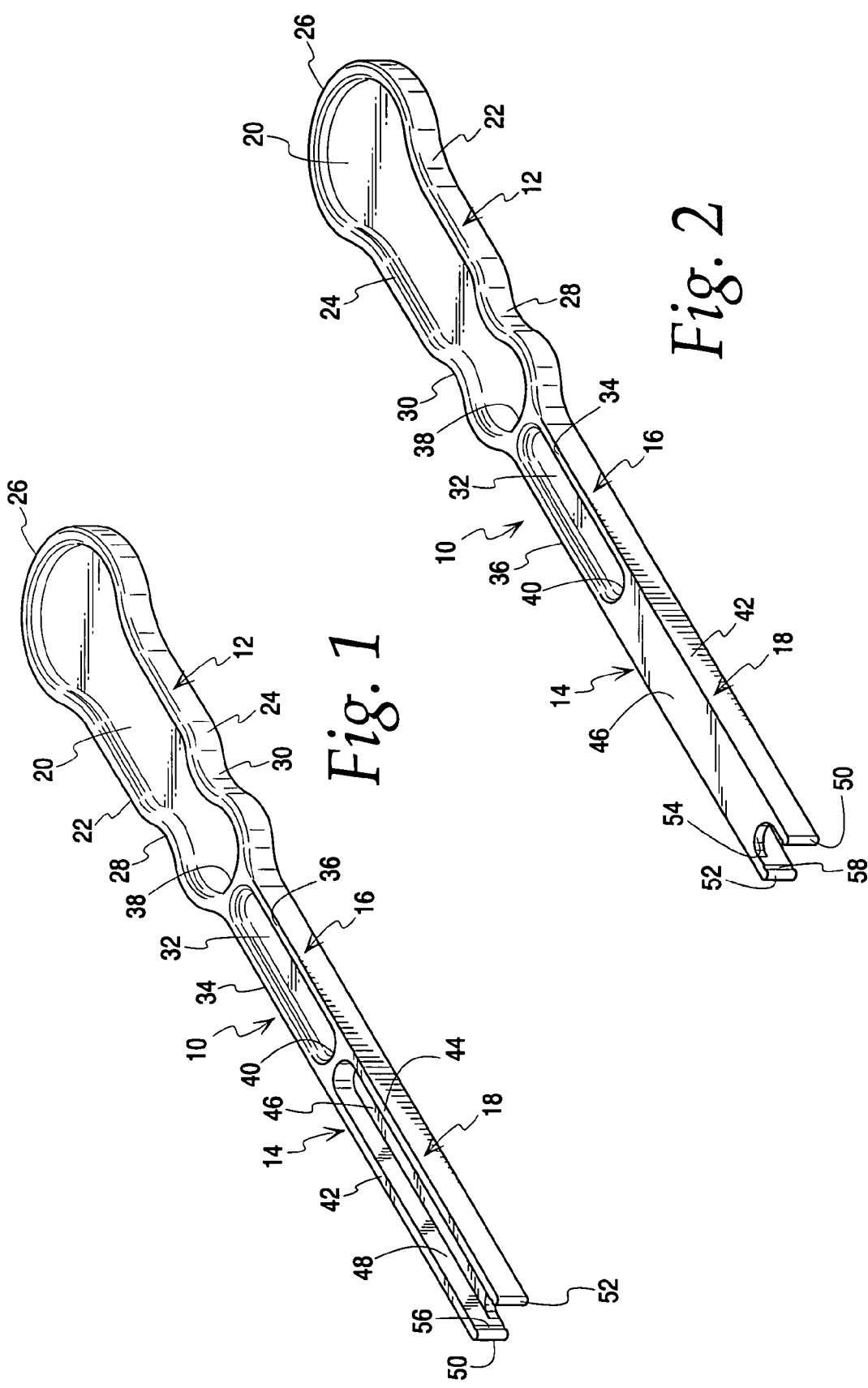

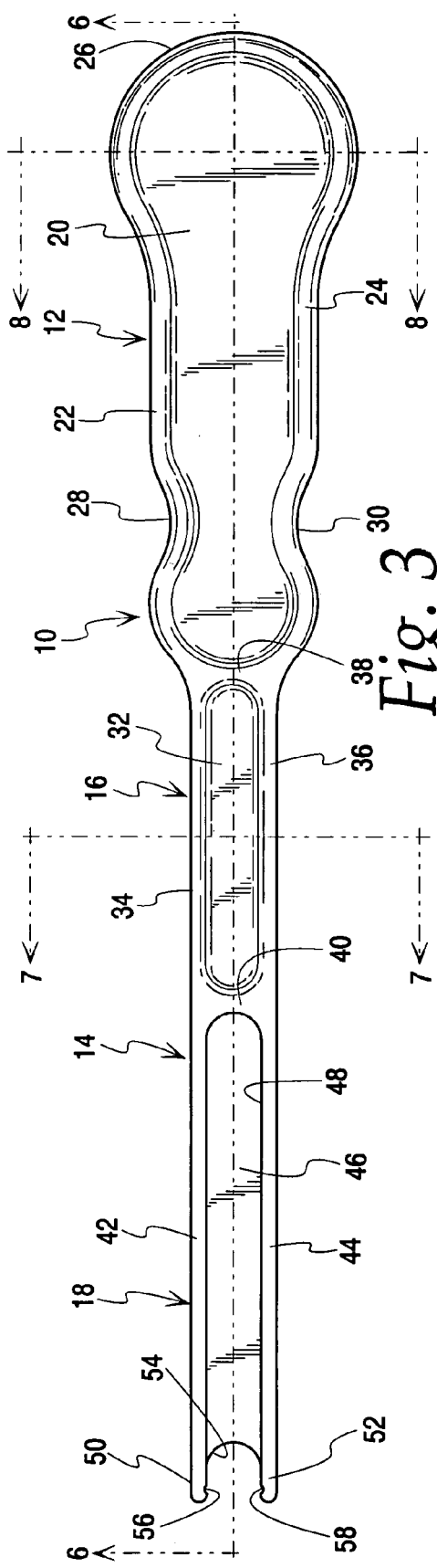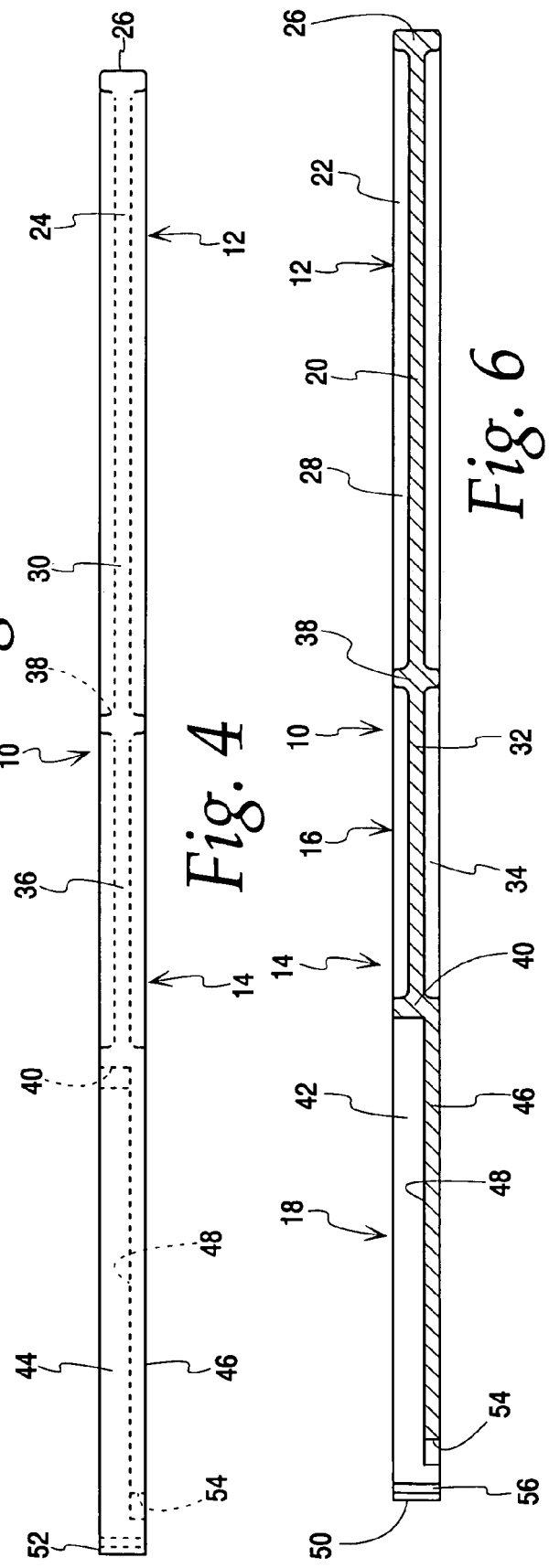

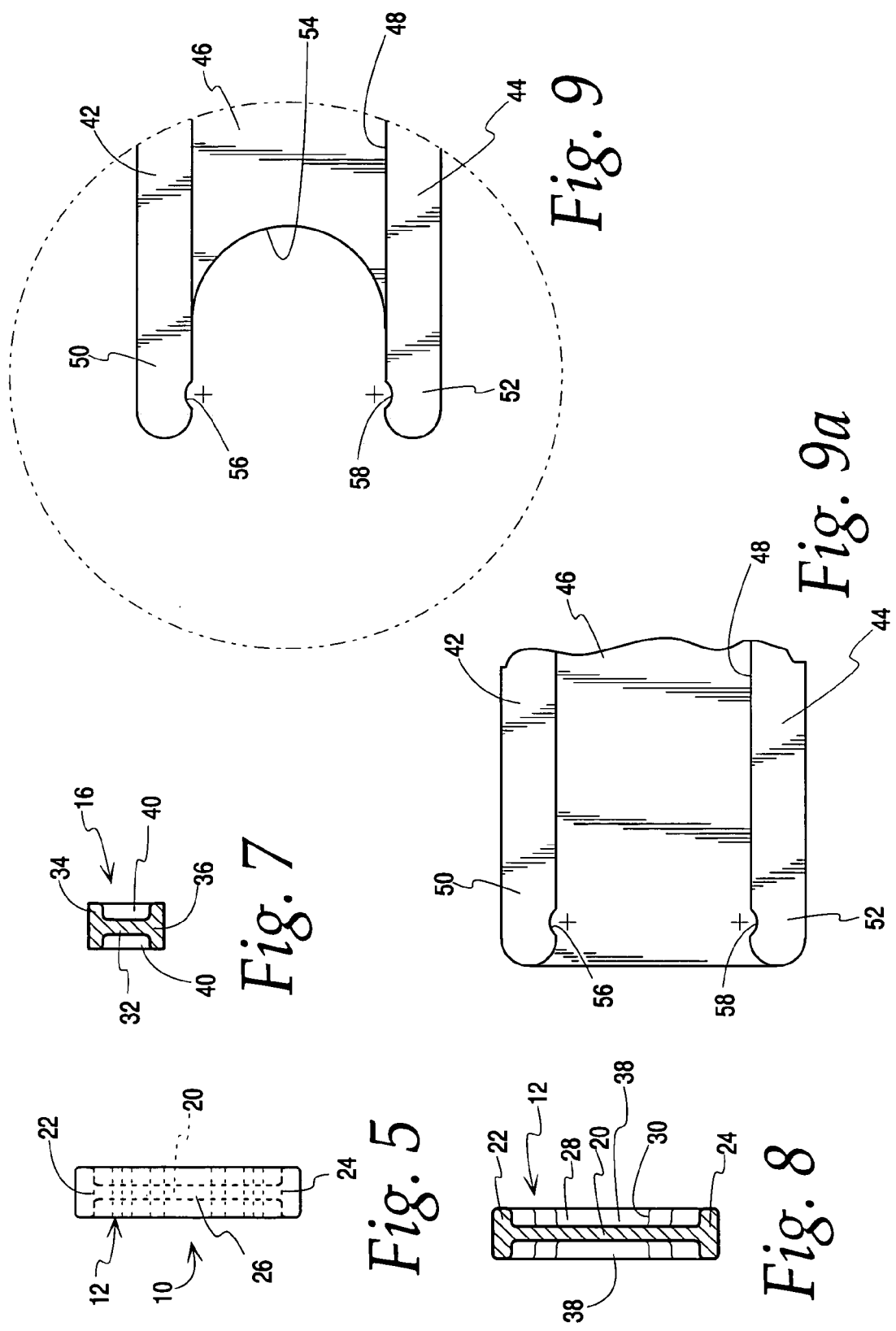

LC CONNECTOR REMOVAL TOOL

CROSS REFERENCE TO RELATED APPLICATION

This application claims the benefit of co-pending provisional application Ser. No. 60/546,730 filed Feb. 23, 2004.

BACKGROUND OF THE INVENTION

This invention relates to tools useful in the installation and maintenance of fiber optic networks. Such networks typically include connector panels or distribution panels where a plurality of fiber optic patch cords are connected. These panels mount a plurality of LC adaptors, which are housings with a socket or port formed therein. The sockets are designed to receive a fitting on the end of a patch cord. The fitting is called an LC connector. The standard LC connector has a body from which a flexible latch extends. The latch is releasably engageable with the LC adaptor. The latch prevents unintentional removal of the LC connector from the adaptor but the latch can be depressed to permit intentional removal of the connector. Some LC connectors include a trigger that is engageable with the latch to move the latch to its release position. Between-the-wall connectors do not include such a trigger. In any event, access to the latch can be a problem. Adaptors on a connector panel or distribution panel are typically densely packed in order to save space. The resulting crowd of patch cords renders access to the latches of all but the outermost LC connectors difficult to impossible for the technician's fingers.

Technicians sometimes in the past have used medical forceps to enable the removal of the connectors. But this practice is contrary to accepted industry standards. The reason is such tools are made of metal and as such they are subject to creating electrostatic discharge that can harm the network. Furthermore, medical forceps are relatively expensive for this purpose. The present invention is specifically concerned with a tool for releasing and removing an LC connector from the socket of an LC adaptor. The tool is effective, inexpensive and not subject to electrostatic discharge.

SUMMARY OF THE INVENTION

The present invention is directed to a tool for removing a fiber optic patch cord from a connector adaptor. A primary object of the invention is a tool of the type described which can fit in very tight spaces and engage the release latch of an LC connector.

Another object of the invention is a tool which can engage an LC connector for pulling it out of the adaptor after releasing the latch.

A further object of the invention is a tool of the type described which is not subject to electrostatic discharge.

Yet another object of the invention is a tool which is durable, simple to use and cost effective.

These and other desired benefits of the invention, including combinations of features thereof, will become apparent from the following description. It will be understood, however, that a device could still appropriate the claimed invention without accomplishing each and every one of these desired benefits, including those gleaned from the following description. The appended claims, not these desired benefits, define the subject matter of the invention.

The tool has a handle connected to an elongated shank. Portions of the handle and shank have cross sections in the form of an I-beam. The shank terminates at a head. Toward the head end the shank has a channel-shaped cross section including first and second walls which are connected by a side wall. Together the first, second and side walls define a clearance groove between them. The head includes a pair of spaced fingers which extend from the first and second walls of the shank. On the inner, facing surfaces of the fingers there are detent grooves that extend across the width of the fingers. The tips of the fingers are spaced to fit around an LC connector body while an upper one of the fingers overlies the latch or trigger. The upper finger depresses the latch or trigger as the tool slides over the LC connector. The trigger or latch then engages the detent groove. This engagement of the trigger or latch with the detent groove permits the tool to pull the connector out of its adaptor socket.

BRIEF DESCRIPTION OF THE DRAWINGS

FIG. 1 is a perspective view of the front of the removal tool of the present invention.

FIG. 2 is a perspective view of the rear of the removal tool of the present invention.

FIG. 3 is a front elevation view of the removal tool.

FIG. 4 is a bottom plan view of the removal tool.

FIG. 5 is an end elevation view of the tool, looking at the handle end.

FIG. 6 is a section taken along line 6—6 of FIG. 3.

FIG. 7 is a section taken along line 7—7 of FIG. 3.

FIG. 8 is a section taken along line 8—8 of FIG. 3.

FIG. 9 is a front elevation view, on an enlarged scale, of the head end of the tool.

FIG. 9a is a view similar to FIG. 9, showing an alternate embodiment.

DETAILED DESCRIPTION OF THE INVENTION

Figure 10:
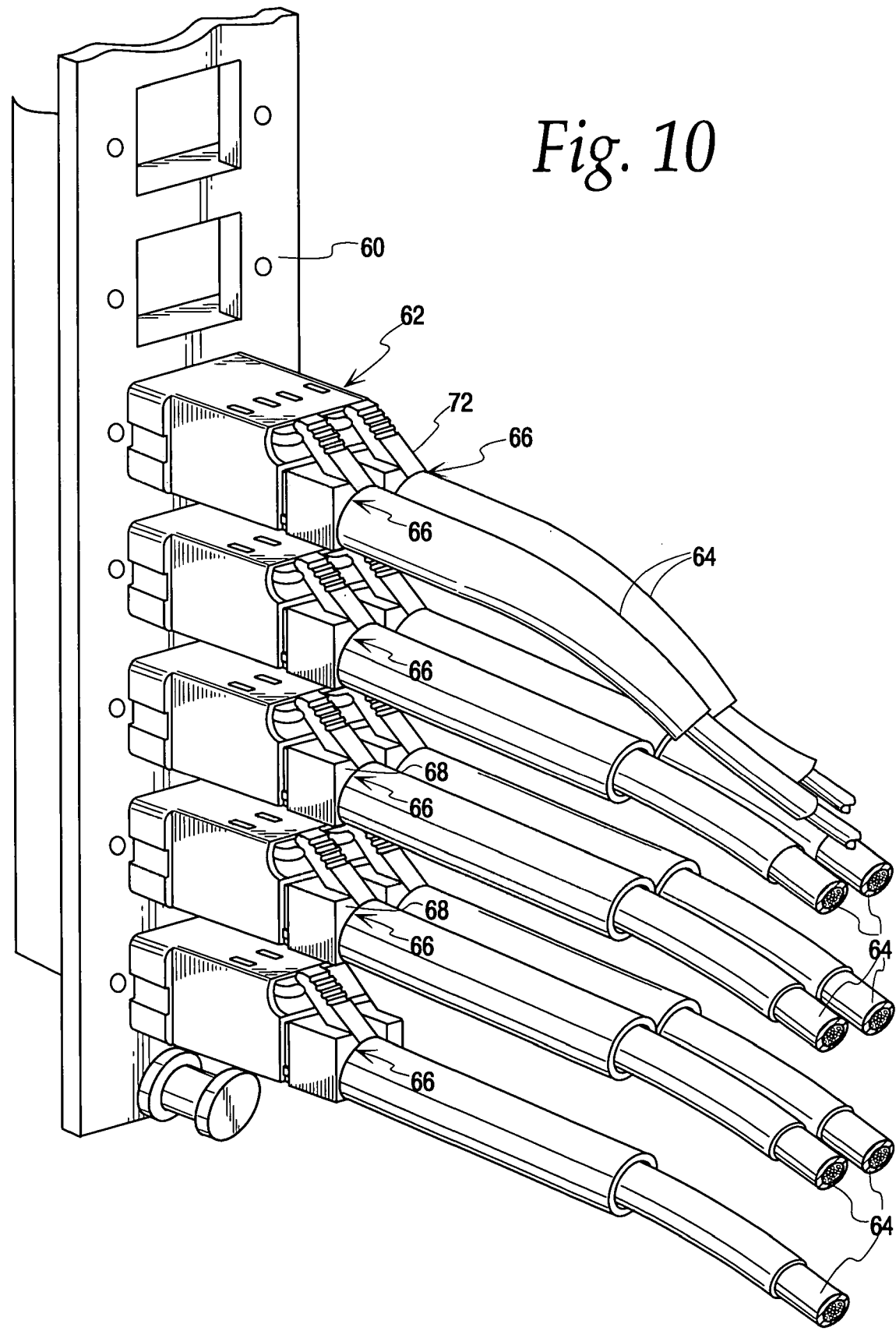
FIG. 10 is a perspective view of a fiber optic network distribution panel having a plurality of LC connector adaptors mounted thereon, with fiber optic patch cords equipped with LC connectors installed in the adaptors.

FIGS. 1 and 2 illustrate generally the LC connector removal tool 10 of the present invention. For purposes of description the side of the tool having the open channel at the head end of the shank will be considered the front side while the opposite side will be called the rear side. It will be understood that these designations are largely arbitrary as there is no characteristic that functionally would ascribe the term front or back to either side of the tool. The tool has two main parts, a handle 12 and a shank 14. The shank itself has two separately identifiable sections, a central portion 16 and an outer portion 18. The entire tool is preferably integrally molded from a suitable plastic material. As such the tool is not subject to electrostatic discharge and no special precautions against such discharge must be taken to use the tool. For reference purposes only, and not by way of limitation, the overall length of the tool may be about nine inches and the outer portion 18 may have a length of about three inches.

Details of the handle 12 can be seen in FIGS. 3, 5 and 8. The handle has a cross section in the form an I-beam. This includes a web 20, an upper flange 22 and a lower flange 24. The upper and lower flanges merge with one another at a rounded end portion 26 and at the junction with the shank 14. First and second depressions 28 and 30 are formed near the inner end of the handle. These are suitable for receiving a user's fingers, for example a thumb on the upper side and a forefinger on the lower side.

As best seen in FIG. 7, the central portion 16 of the shank 14 also has a cross section in the form of an I-beam. This includes a web 32 disposed between an upper flange 34 and a lower flange 36. The flanges 34,36 merge with those of the handle at a handle-shank junction 38. The other end of the central portion similarly joins the outer portion 18 of the shank at a shank junction 40. Both junctions 38 and 40 extend across the full thickness of the tool, as can be seen in FIG. 6. Use of the I-beam cross section in the handle and central shank portion provides adequate strength while minimizing use of material.

The outer portion 18 of the shank is illustrated in FIGS. 3, 4 and 6. The outer portion includes a first wall 42, a second wall 44 and a side wall 46. It will be noted that unlike the webs 20 and 32, the side wall 46 is not located at the center of the first and second walls 42, 44. Instead, the side wall is at one edge of these walls. This arrangement provides the outer portion 18 with a cross section in the form of a channel section. The interior of the channel section defines an elongated clearance groove 48 between the first wall 42, second wall 44 and side wall 46. The clearance groove provides a space which receives a connector body, as will be explained below.

The free end of the outer portion 18 terminates at a head 49. The head includes first and second fingers 50 and 52. The fingers are extensions of the first and second walls 42, 44 beyond the arcuate terminus 54 of the side wall 46. Stopping the terminus short of the fingers provides side clearance for the connector adaptor when the tool is in use. Each finger has a detent groove 56, 58 extending across its width.

Figure 11:
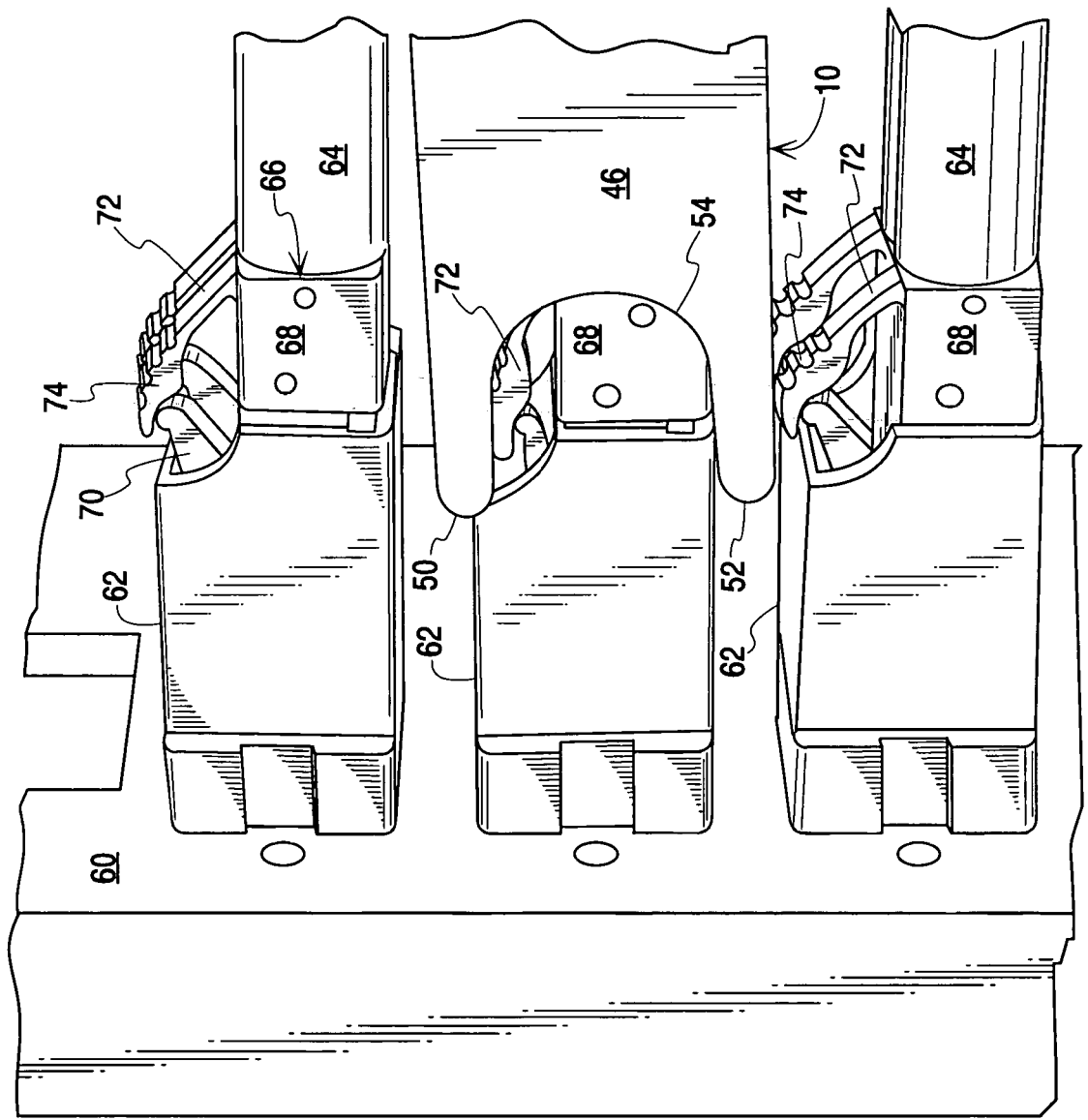
FIG. 11 is a perspective view, on an enlarged scale, of the removal tool of the present invention engaging the middle one of three closely adjacent LC connectors.

Turning now to FIGS. 10 and 11, a connector panel or distribution panel for a fiber optic network is shown generally at 60. A plurality of LC adaptors 62 are mounted in the distribution panel. In the illustrated embodiment the adaptors are duplex adaptors which can receive two patch cords 64. The tool 10 is equally adapted for use with simplex adaptors which receive but a single patch cord. Each patch cord 64 terminates at an LC connector 66. Each connector includes a body 68 and a latch 70. The latch is pivotally attached to the body and includes a catch (not shown) that is engageable with the adaptor upon insertion of the connector 66 into the adaptor. In the embodiment shown each connector further includes a trigger 72. The trigger is also pivotally attached to the connector body. The trigger overlies the latch 70 such that pivoting motion of the trigger imparts a pivoting motion of the latch. The outer surface of the trigger has a series of alternating transverse grooves and ridges. One of the ridges is shown at 74. The trigger outer surface is angled compared to the axis of the patch cord 64.

The use, operation and function of the LC connector removal tool are as follows. A user grasps the handle 12 and orients the shank 14 generally parallel to the axis of the patch cord 64. The shank is then moved axially along the patch cord 64 toward the LC connector 66. The shank is held so the patch cord fits into the clearance groove 48. As the shank continues to move axially along the patch cord the first finger 50 engages the trigger 72 while the second finger 52 slides underneath the connector body 68. Continued movement of the shank causes the first finger to slide up the ramp surface of the trigger, pushing the trigger downwardly. Eventually the tips of fingers 50, 52 move completely past the connector and fit over and under the adaptor 62, as seen in the middle LC connector of FIG. 11. At this point the foremost portion of the side wall 46 may be located adjacent the outermost portion of the side of the connector body 68. Also, in the tool location of FIG. 11 the first finger 50 has fully depressed the trigger which in turn has depressed the latch 70 to release it from the adaptor. In addition the detent groove 56 on the finger 50 has moved to a point where it engages a ridge 74 on the trigger's outer surface. Even if the tool is inserted such that the detent groove goes past the trigger, the trigger is resiliently biased against the underside of the finger 50. Thus, when the user retracts the removal tool, the detent groove will at some point engage one of the trigger ridges. This locks the tool to the trigger for removal of the connector. While this single point connection would, if it were the only engagement of the tool and the connector, tend to cause the connector body 68 to cant or tilt upon retraction of the tool (and thereby bind in the adaptor), it is prevented from doing so by engagement of the second finger 52 and the second wall 44 with the underside of the connector body. Therefore, with the finger having previously released the latch 70, the connector 66 is free to slide out of the adaptor 62 as the tool 10 is retracted. Once the LC connector 66 clears the other patch cords, the removed connector is released from the clearance groove 48 of the tool by simply moving the tool transversely to the connector's axis.

It can be seen that the channel-shaped outer portion 18 of the removal tool provides the ability to access duplex connectors from either the left or the right side of the connector, whichever is the open side. The user simply flips the tool over so the clearance groove 48 is open to the accessible side of the connector. With this construction no part of the tool has to fit between installed duplex connectors. Since each finger 50, 52 has a detent groove 56, 58 it does matter how the tool is oriented so long as one of the fingers ends up engaging the trigger upon insertion of the tool. It will be similarly noted that the tool can be used with between-the-wall type connectors which do not have a trigger. In that case the involved detent groove 56 or 58 would engage the upraised tab which is formed on the end of the latch itself.

In the alternate embodiment shown in FIG. 9a, the head 49 is altered by removing the arcuate terminus 54. In other words, the side wall 46 extends fully to the ends of the first and second walls 42, 44. While the detent grooves 56 and 58 are still formed on the first and second walls, no fingers are defined on those walls because there is no cut out portion in the side wall. This embodiment works in a manner similar to that described above.

While a preferred form of the invention has been shown and described herein, it should be realized that there may be many modifications, substitutions and alterations thereto. For example, the handle shape could be other than as shown. To accommodate different sizes of connectors, a plurality of shank outer portions could be provided for attachment to a common handle. Each shank outer portion would have its own finger spacing. Another possibility for handling variable connector sizes would be to provide a series of stepped end portions on one of the first and second walls of the outer portion. Then a removable finger portion could be attached to a selected one of these stepped wall portions to locate the removable finger at the desired separation from the other finger.

What is claimed is:

1. An LC connector removal tool, comprising:
   a shank having a first wall, a second wall and a side wall connected to the first and second walls, the first, second and side walls defining a clearance groove between them;

a detent groove formed in at least one of the first or second wall.

2. The LC connector removal tool of claim 1 further comprising a handle connected to the shank.

3. The LC connector removal tool of claim 2 wherein the handle has a cross section in the shape of an I-beam.

4. The LC connector removal tool of claim 2 wherein the shank further comprises a central shank portion connected to the handle.

5. The LC connector removal tool of claim 4 wherein the central shank portion has a cross section in the shape of an I-beam.

6. The LC connector removal tool of claim 1 wherein at least one of the first and second walls extends beyond the side wall to define a first finger in said one wall.

7. The LC connector removal tool of claim 6 wherein the otter of the first and second walls extends beyond the side wall to define a second finger in said other wall in facing relation with the first finger.

8. The LC connector removal tool of claim 7 wherein the side wall terminates at an arcuate portion.

9. The LC connector removal tool of claim 1 wherein the first and second walls define edges thereof and the side wall is connected to said edges.

10. The LC connector removal tool of claim 1 further comprising a detent groove formed in the other of the first or second wall.

* * * * *